United States Patent [19]
Suzuki et al.

[11] 3,985,942
[45] Oct. 12, 1976

[54] REGULATION OF THE DEGREE OF POLYMERIZATION OF VINYL OR VINYLIDENE MONOMERS WITH 2,5-DIHYDROFURANS

[75] Inventors: Masayasu Suzuki; Mitsuru Hoshino; Masaki Ohya, all of Iwaki, Japan

[73] Assignee: Kureha Kagaku Kogyo Kabushiki Kaisha, Japan

[22] Filed: Jan. 15, 1975

[21] Appl. No.: 541,272

[30] Foreign Application Priority Data
Jan. 23, 1974 Japan.................................. 49-9920

[52] U.S. Cl................................. 526/270; 526/204
[51] Int. Cl.[2]......................................... C08F 234/02
[58] Field of Search.................. 260/85.5 R, 85.5 N, 260/86.7, 80.72, 88.3 A, 92.8 R, 92.1, 93.5 R, 89.1, 91.1 M, 63, 80, 89.5 A, 88.7 R, 88.7 F, 89.7 R; 526/270, 204

[56] References Cited
UNITED STATES PATENTS
3,271,375   9/1966   Delacretaz..................... 260/85.5 R Primary Examiner—Harry Wong, Jr.
Attorney, Agent, or Firm—Wenderoth, Lind & Ponack

[57] ABSTRACT

A process for producing vinyl or vinylidene polymers comprising polymerizing vinyl or vinylidene monomers in the presence of 0.1 to 5.0 % by weight of at least one compound represented by the following formula based upon the total weight of monomers, wherein the degree of polymerization of the vinyl or vinylidene polymers is controlled,

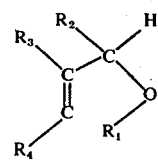

wherein $R_1$ is $(CR_5R_6)_n$ wherein $R_5$ and $R_6$ are hydrogen atoms or alkyl groups containing 1 to 4 carbon atoms and n is an integer of 1 or more; $R_2$ is a hydrogen atom or an alkyl group containing 1 to 4 carbon atoms; and $R_3$ and $R_4$ are hydrogen atoms or alkyl groups containing 1 to 4 carbon atoms may be combined to form a ring.

7 Claims, No Drawings

REGULATION OF THE DEGREE OF POLYMERIZATION OF VINYL OR VINYLIDENE MONOMERS WITH 2,5-DIHYDROFURANS

BACKGROUND OF THE INVENTION

The present invention relates to a process for controlling the degree of polymerization of vinyl polymers. The term "vinyl polymers" as herein used includes both vinyl homopolymers and vinyl copolymers.

It is well known that where vinyl monomers are polymerized in the presence of a conventional radical initiator, polymers having a high degree of polymerization can be obtained.

Particularly, in the case of acrylic monomers, polymers having a considerably high melt viscosity are obtained. Thus, these polymers are accompanied by problems such as difficulty in molding, high temperature required for the molding, coloring or decomposition by heating of moldings of the polymers, which give rise to deterioration in quality, and furthermore, difficulty of carrying out a long molding operation.

Thus, in order to produce polymers having good workability, methods for controlling the degree of polymerization of the polymers to lower levels, for example, by polymerizing at high temperatures, or by adding a chain transfer agent, have been employed.

In the method in which the polymerization temperature is raised, the degree of polymerization cannot be controlled as desired, and furthermore, polymers having branched chains are produced because of the high polymerization temperature, which results in reduction of heat stability in the case of some kinds of monomers used. Thus, this method is not desirable.

In the method comprising adding a chain transfer agent, hitherto known chain transfer agents have various defects, and satisfactory ones have not been found. For example, as effective chain transfer agents for the polymerization of vinyl monomers, halogenated hydrocarbons, halogenated carbons, amines, mercaptans, hydroquinones, unsaturated cyclic terpenes, and the like are known. However, all these compounds are accompanied by problems.

In the polymerization of vinyl monomers, carbon tetrabromide, which is a typical example of the halogenated carbons, is an excellent chain transfer agent and is capable of providing vinyl polymers having low degrees of polymerization. However, the vinyl polymers obtained are extremely inferior in heat stability and are considerably colored at the molding stage, thus being of low practicality. Of the mercaptans, low molecular weight mercaptans containing, for example, 2 or 4 carbon atoms are highly effective and are capable of providing low molecular weight vinyl polymers without causing reduction of heat stability as caused with the carbon tetrabromide. However, the vinyl polymers obtained have a considerably unpleasant odor and retard the polymerization reaction. Also, mercaptans containing 8 or more carbon atoms are effective chain transfer agents, but the vinyl polymers obtained have unpleasant odor, and unreacted mercaptans are difficult to remove because the boiling point thereof is high. Thus, these vinyl polymers are not suitable for use in a material for packages, containers, or the like for foodstuff and are limited in use to an extremely narrow field.

Moreover, the amines, hydroquinones, and unsaturated cyclic terpenes have a fatal drawback in that they retard or stop the polymerization reaction although they are effective chain transfer agents.

In general, as the chain transfer agent, those compounds which contain atoms that easily cause an extraction reaction or the like to move a radical and which stabilize a polymer radical, for example, a hydrogen atom, a halogen atom, and the like are used. With these compounds, it is required that the bond energy of the hydrogen atom or the like be of an order such that the hydrogen atom or the like is easily extracted by a polymer radical and that a chain transfer agent radical formed by the above extraction reaction has a property to initiate again the polymerization reaction.

Thus, our attention has been attracted by the fact that the bond energy between a hydrogen atom and a carbon atom at the allyl position of an allyl structure is small, and we have carried out extensive studies on chain transfer agents for controlling the degree of polymerization in polymerizing vinyl monomers. As a result, it has been found that those compounds having an allyl oxy structure, $-CH=CH-CH_2-O-$, which forms a cyclic ether structure, have an excellent chain transfer effect. Furthermore, it has been found that these compounds neither hinder the polymerization reaction nor deteriorate the heat stability of a polymer formed and provide a polymer free of unpleasant odor.

SUMMARY OF THE INVENTION

An object of the present invention is to provide a process for producing vinyl polymers wherein the degree of polymerization of the vinyl polymers is effectively controlled.

Another object of the present invention is to provide a process for producing vinyl polymers which are excellent in workability.

A further object of the present invention is to provide a process for producing vinyl polymers which are excellent in heat-stability and are free from unpleasant odor.

Other objects and advantages of the present invention will become apparent from the following detailed description.

These objects are attained by using as a chain transfer agent at least one compound represented by the following formula.

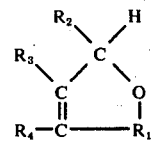

wherein
$R_1 = -(CR_5R_6)_n-$, $n \geq 1$, preferably 1 or 2;
$R_2$, $R_5$, $R_6$ = a hydrogen atom, or an alkyl group containing 1 to 4 carbon atoms; and
$R_3$, $R_4$ = a hydrogen atom, or an alkyl group containing 1 to 4 carbon atoms, or $R_3$ and $R_4$ may be combined to form a ring which may be a 4- to 8-membered ring, preferably a 6-membered ring, together with the two carbon atoms to which the $R_3$ and $R_4$ are attached and which may be an aliphatic or aromatic.

DETAILED DESCRIPTION

The chain transfer agents in accordance with the present invention are, as represented by the above formula, cyclic ether compounds or alkyl-substituted derivatives thereof which have one double bond in their principal ring and have in the ring an allyloxy structure in which an ether oxygen atom is attached to a carbon atom that is attached to the carbon atom in the double bond and is thus an allyl carbon atom, the allyl carbon atom having at least one hydrogen atom. The alkyl substituent contains 1 to 4 carbon atoms.

Examples of these compounds include, for example, 2,5-dihydrofuran, 3,6-dihydro-2H pyran, phthalan, and the like, and derivatives thereof having one or more methyl groups, ethyl groups, normal or iso-propyl groups, or normal, iso-, secondery or tertiary butyl groups as a substituent within the scope represented by the above formula, can be used.

In producing vinyl polymers according to the present invention, cyclic ether compounds represented by the above formula are added, singly or in a combination thereof, in a proportion of 0.1 to 5.0% weight based upon the total weight of vinyl monomers.

It is desirable that the quantity of the cyclic ether compound to be added be in the range of from 0.1 to 5.0, especially preferably from 0.5 to 3.0,% by weight based upon the weight of the vinyl monomer. If the quantity is below 0.1% by weight, the effect of chain transfer is small, and thus no polymer of high workability and low degree of polymerization can be obtained. On the other hand, if the quantity is above 5.0% by weight, not only is the degree of polymerization excessively decreased, but also the quantity of the chain transfer agent chemically bound to the polymer is increased, whereby the properties of the polymer are undesirably changed.

Vinyl or vinylidene monomers which can be used in the present invention, are, for example, vinyl chloride, vinyl bromide, vinyl fluoride, styrene, vinyl acetate, methyl vinyl ether, ethyl vinyl ether, methyl vinyl ketone, ethyl vinyl ketone, phenyl vinyl ketone, acrylic acid, methacrylic acid, methyl acrylate, ethyl acrylate, n-propyl acrylate, isopropyl acrylate, n-butyl acrylate, octyl acrylate, 2-ethyl-hexyl acrylate, acrylonitrile, acrylamide, methyl methacrylate, ethyl methacrylate, and methacrylonitride. These monomers can be homopolymerized or copolymerized by any known polymerization method using a radical initiator, for example, an emulsion polymerization, a suspension polymerization, a bulk polymerization, a solution polymerization, or the like.

The polymerization temperature is generally in the range of from about 10° to 80° C.

Of the vinyl polymers as produced in accordance with the present invention, those of higher workability have lower degree of polymerization, and furthermore, the heat stability thereof does not deteriorate.

In the following Examples and Comparison Examples, the degree of polymerization of a polymer is indicated by the reduced viscosity (hereinafter referred to as $\eta_{sp}/C$) of the polymer in dimethylformamide (hereinafter referred to as DMF) solution (4 gram/liter) in the unit of liter/gram.

In the measurement of the heat stability of a polymer, the polymer is pressed under a load of 100 kg/cm$^2$ at a temperature of 235° C for 10 minutes with a heat press tester, and the degree of coloration of the pressed polymer plate is judged by the naked eye.

With regard to odor, a polymer is first pressed at a temperature of 200° C under a load of 100 kg/cm$^2$ for 2 minutes, and 6 sheets of 4 × 6 cm pressed polymer plate having a thickness of 0.5 mm are dipped in 300 ml. of distilled water in a cylinder equipped with a stopper and subjected to extraction therein at 60° C for 24 hours. Thereafter, the odor of the water is measured. In this case, distilled water which has been left standing under the same conditions as employed above, i.e., at a temperature of 60° C for 24 hours is used as a reference control.

The present invention will now be described in greater detail with respect to the following Examples and Comparison Examples.

EXAMPLE 1

A 200 ml. glass ampule was charged with 18 g. of acrylonitrile (AN) and 6 g. of methyl acrylate (MA) as a monomer, 112 g. of dimethylformamide (DMF) as a solvent, 0.12 g. of azobisisobutylonitrile (AIBN) as an initiator, and 1.2 g. of 2,5-dihydrofuran as a chain transfer agent. The glass ampule was amply purged with nitrogen, a solution polymerization was carried out.

After the polymerization was conducted at 60° C for 3 hours, methanol was poured into the polymerization solution to precipitate a polymer. The polymer was separated from methanol and dried in hot air at 60° C for 24 hours.

The polymer thus obtained was in the form of a white powder in a yield of 17.5% by weight, and the reduced viscosity of the polymer was 0.0266. This polymer was pressed into a plate, which was extracted with distilled water at 60° C for 24 hours. The odor of the extract could not be detected. In the heat-stability test, coloration was not observed.

EXAMPLE 2

In the same manner as in Example 1, a 200 ml. glass ampule was charged with 18 g. of AN, 6 g. of MA, 112 g. of DMF, 0.12 g. of AIBN as an initiator, and 1.2 g. of 2,5-dimethylfuran as a chain transfer agent, and the ampule was amply purged with nitrogen gas. The polymerization was conducted at 60° C for 3 hours. The yield of the resulting polymer precipitated with methanol and dried was 18.0% by weight, and the reduced viscosity was 0.0293.

In the heat stability and odor tests, the coloration of the pressed polymer plate was not observed, and odor of the polymer was not detected.

COMPARISON EXAMPLE 1

Polymerization was conducted in the same manner as in Example 1 with the use of the compounds indicated in Table 1 as chain transfer agents.

Table 1

Kind of chain transfer agents added and reduced viscosity

| Run No. | AN/MA (g.) | DMF (g.) | ALBN (g.) | Chain Transfer Agent Name of Compound | Amount (g.) | Polymerization Period (hrs.) | Yield (% by weight) | Reduced Viscosity (l./g.) |
|---|---|---|---|---|---|---|---|---|
| 3* | 18/6 | 112 | 0.12 | No addition | — | 3 | 18.0 | 0.0898 |
| 4* | " | " | " | Tetralin | 1.2 | " | 17.5 | 0.0738 |
| 5* | " | " | " | Acetal | " | " | 19.0 | 0.0879 |
| 6* | " | " | " | Cycloheptene | " | " | 17.5 | 0.0656 |
| 7* | " | " | " | Diisopropyl Ether | " | " | 17.5 | 0.0892 |
| 8* | " | " | " | Methyl Orthoformate | " | " | 18.0 | 0.0896 |
| 9* | " | " | " | Cyclohexene | " | " | 14.0 | 0.0655 |
| 10* | " | " | " | Cyclopentene | " | " | 18.0 | 0.0550 |
| 11* | " | " | " | Tetrahydrofuran | " | " | 18.0 | 0.0836 |
| 12* | " | " | " | n-Dodecyl Mercaptan | " | " | 19.0 | 0.0309 |

*Comparison example

By comparing the reduced viscosity of the polymers produced with the use, as chain transfer agents, of those compounds indicated in Table 1 except for normal dodecylmercaptan with the reduced viscosity of the polymers produced through the use of 2,5-dihydrofuran and 2,5-dimethylfuran in Examples 1 and 2, it can be seen that the cyclic ether compounds as used in the examples of the present invention are markedly excellent chain transfer agents. No reduction in the polymerization yield was observed.

EXAMPLE 3

In an emulsion polymerization, 2,5-dihydrofuran was used as a chain transfer agent, and the added quantity of 2,5-dihydrofuran and the chain transfer effect were examined.

Into a 500 ml. glass ampule were charged 75 g. of AN, 25 g. of MA, 0.2 to 10.0 g. of 2,5-duhydrofuran, 200 g. of deionized water, 1.0 g of sodium dodecylbenzene sulfonate, 0.16 g. of potassium persulfate, and 0.04 g of sodium hydrogensulfite, and the pH of the resulting aqueous solution was adjusted to 5.0. After purging with a nitrogen gas, the polymerization was conducted at 50° C for 20 hours.

The latexes thus obtained were precipitated with aluminum sulfate and, after washing and dehydration, were dried in hot air at 60° C for 24 hours, whereupon white powder polymers were obtained. In each case, the polymerization yield was 90% or more. The quantity of the chain transfer agent added, the reduced viscosity of the polymer obtained, and heat stability are shown in Table 2.

Table 2

Quantity of 2,5-dihydrofuran added, reduced viscosity of polymer, and heat stability

| Run No. | Chain Transfer Agent Name of Compound | Amount (g.) | Reduced Viscosity (l./g.) | Heat stability** |
|---|---|---|---|---|
| 13* | No Addition | — | 0.71 | Yellow |
| 14 | 2,5-Dihydrofuran | 0.2 | 0.29 | Faint Yellow |
| 15 | " | 0.5 | 0.16 | Colorless |
| 16 | " | 1.0 | 0.098 | " |
| 17 | " | 2.0 | 0.061 | " |
| 18 | " | 3.0 | 0.047 | " |
| 19 | " | 4.0 | 0.036 | " |
| 20 | " | 5.0 | 0.032 | " |
| 21* | " | 10.0 | 0.020 | Pale Yellow |
| 22* | Cyclohexene | 5.5 | 0.117 | Yellow |
| 23* | n-Dodecyl Mercaptan | 1.6 | 0.091 | Colorless |

*Comparison example
**The degree of coloration in heat stability is shown in the order of color intensity as follows: Yellow>Pale Yellow>Faint Yellow>Colorless The addition of 2,5-dihydrofuran as a chain transfer agent was effective in a small amount, and the heat stability of the polymers obtained was good. The polymer produced by adding n-dodecyl mercaptan as a chain transfer agent in Run No. 23 emitted an unpleasant odor, but with other polymers, no odor was detected.

The polymer produced by a adding no chain transfer agent had a very high melt viscosity, was poor in workability, and was colored yellow. In contrast, the polymer produced by adding 2,5-dihydrofuran in an amount of 10 parts by weight based upon the weight of monomer was colored when subjected to heat pressing, and, further, it was so brittle and fragile that it was impossible to satisfactorily take out the press plate.

EXAMPLE 4

Styrene (St) and methyl methacrylate (MMA) were used as a vinyl monomer, and 2,5-dihydrofuran was used as a chain transfer agent in solution polymerization. As a solvent, benzene was used, and the solution polymerization was conducted at 60° C. As in Example 1, a polymer was precipitated with methanol.

Table 3

Chain Transfer Effect of 2,5-Dihydrofuran in Polymerization of St and MMA

| Run No. | Monomer (g.) | Benzene (g.) | AIBN (g.) | Chain Transfer Agent Name of Compound | Amount (g.) | Polymerization Period (hrs.) | Yield (% by weight) | Reduced** Viscosity (l.g.) |
|---|---|---|---|---|---|---|---|---|
| 24* | St 27 | 105 | 0.12 | No Addition | — | 3 | 4.0 | 0.0674 |
| 25 | St 27 | " | " | 2,5-Dihydrofuran | 1.35 | " | 3.9 | 0.0220 |
| 26* | MMA 28 | " | " | No Addition | — | " | 18.5 | 0.0588 |
| 27* | " | " | " | n-Dodecyl Mercaptan | 1.40 | " | 10.0 | 0.0138 |
| 28 | " | " | " | 2,5-Dihydrofuran | " | " | 17.5 | 0.0321 |

*Comparison example
**Reduced viscosity was measured in a 2 g./l. benzene solution at 30°C.

It can be seen that 2,5-dihydrofuran, which is one of the chain transfer agents of the present invention, is an effective chain transfer agent in the polymerization of styrene and methyl methacrylate. With the polymer produced by adding 2,5-dihydrofuran, no odor was detected. However, the polymer produced by adding normal dodecylmercaptan in Run No. 27 of the Comparison Example emitted an extremely unpleasant odor.

EXAMPLE 5

In the same manner as in Example 1, 18 g. of AN, 6 g. of MA, 112 g. of DMF, 0.12 g. of AIBN as an initiator and 1.2 g. of 3,6-dihydro-2H pyran as a chain transfer agent were fed into an ampule. After purging with nitrogen gas, the polymerization was conducted at 60° C for 3 hours. Methanol was then poured into the polymerization mass to precipitate a polymer.

The polymer after drying amounted to 17.5 g., and the $\eta_{sp}/C$ was 0.0360 l./g.

In the heat stability test, the coloration of the pressed polymer plate was not observed.

We claim:

1. In the free radical polymerization of at least one monomer selected from the group consisting of vinyl chloride, vinyl bromide, vinyl fluoride, styrene, vinyl acetate, methyl vinyl ether, ethyl vinyl ether, methyl vinyl ketone, ethyl vinyl ketone, phenyl vinyl ketone, acrylic acid, methacrylic acid, methyl acrylate, ethyl acrylate, n-propyl acrylate, isopropyl acrylate, n-butyl acrylate, octyl acrylate, 2-ethyl-hexyl acrylate, acrylonitrile, acrylamide, methyl methacrylate, ethyl methacrylate, and methacrylonitrile, the improvement which comprises conducting the polymerization in the presence of from 0.1 to 5.0 percent by weight, based on the total weight of monomer, of a compound having a chemical structure represented by

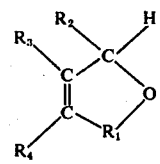

wherein:
$R_1$ is $\text{-}(CR_5R_6)_n$, $n=1$;
$R_2$, $R_5$, and $R_6$ are members selected from the group consisting of a hydrogen atom and alkyl groups containing from 1 to 4 carbon atoms; and
$R_3$ and $R_4$ are hydrogen,
thereby to adjust the polymeric chain length.

2. The process according to claim 1 wherein the compound is 2,5-dihydrofuran.

3. The process according to claim 1 wherein the compound is an alkyl substituted 2,5-dihydrofuran.

4. The process according to claim 3 wherein the alkyl substituent is selected from the group consisting of methyl, ethyl, normal propyl, iso-propyl, normal, iso-, secondary, and tertiary butyl.

5. The process according to claim 1 wherein the quantity of the compound to be added is from 0.5 to 5.0% by weight based upon the total weight of the monomer.

6. The process according to claim 1 wherein the polymerization temperature is from 10° to 80° C.

7. The process according to claim 1 wherein the monomer is selected from the group consisting of styrene, methyl acrylate, acrylonitrile and methyl methacrylate.

* * * * *